United States Patent

[11] 3,602,282

| [72] | Inventor | Katsuji Hirahara<br>San Jose, Calif. |
|---|---|---|
| [21] | Appl. No. | 872,972 |
| [22] | Filed | Oct. 31, 1969 |
| [45] | Patented | Aug. 31, 1971 |
| [73] | Assignee | FMC Corporation<br>San Jose, Calif. |

[54] PEELING TREATED FRUIT TO MINIMIZE SEWAGE WASTE
19 Claims, 14 Drawing Figs.

[52] U.S. Cl. .................................................. 146/222,
146/49 R, 146/226, 146/231
[51] Int. Cl. .................................................. A23n 7/00
[50] Field of Search .................................... 146/49 R,
49 A, 50 R, 32, 222, 226, 231, 276, 291, 304

[56] References Cited
UNITED STATES PATENTS
1,013,506  1/1912  Miller et al. ................... 146/49 R

| 1,682,600 | 8/1928 | Cunico .......................... | 146/304 X |
| 3,517,715 | 6/1970 | Graham et al. ............... | 146/231 |
| 3,480,057 | 11/1969 | Wilhelm ........................ | 146/231 |
| 3,460,162 | 8/1969 | Sijbring ........................ | 146/231 X |
| 3,246,677 | 4/1966 | Hickey et al. ................. | 146/231 |

*Primary Examiner*—Willie G. Abercrombie
*Attorneys*—F. W. Anderson and C. E. Tripp

ABSTRACT: Pears are treated in a hot caustic bath, subjected to a holding step and steamed to loosen the skins. The pears are then confined between upper and lower, downwardly inclined coarse nettings and the nettings are oscillated to lightly abrade and dislodge the loosened skins. The loosened skins and associated caustic are collected separately for drying and incineration. The partially peeled pears are delivered to a brush washer wherein remaining fragments are removed by abrasion and flushing, thereby minimizing the amount of skins and caustic that must be sent as waste to the sewage disposal system.

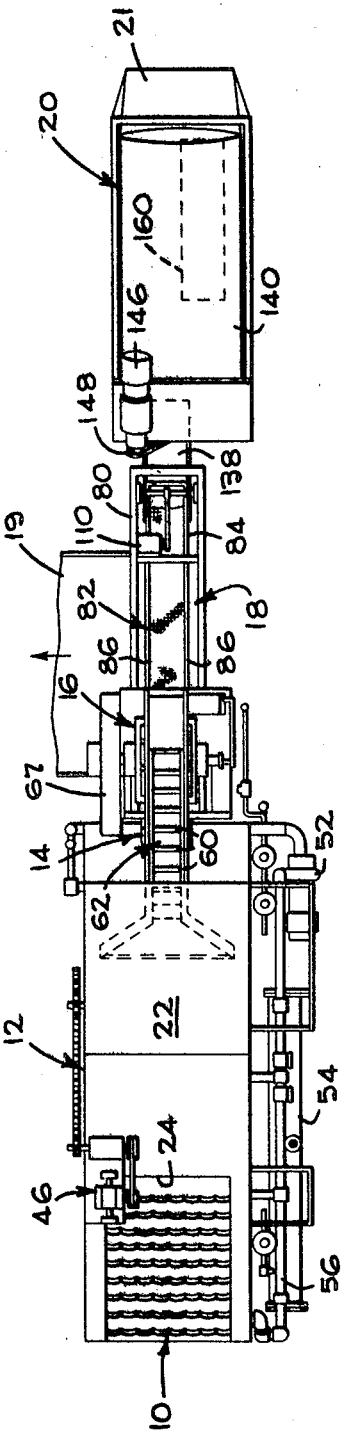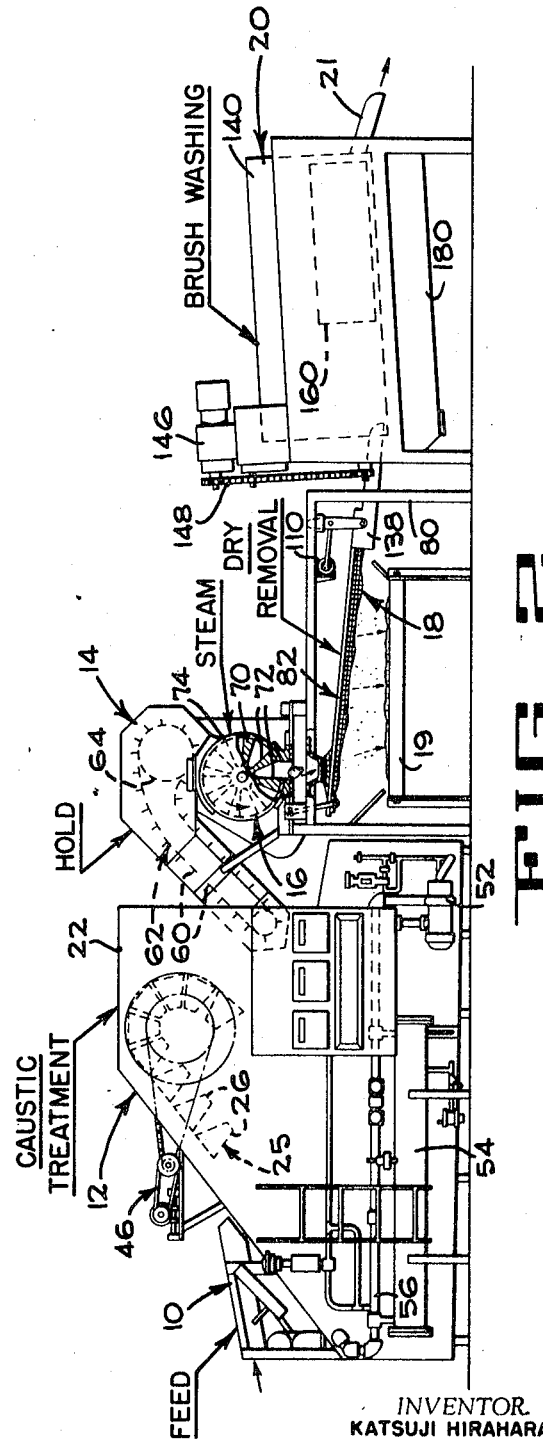

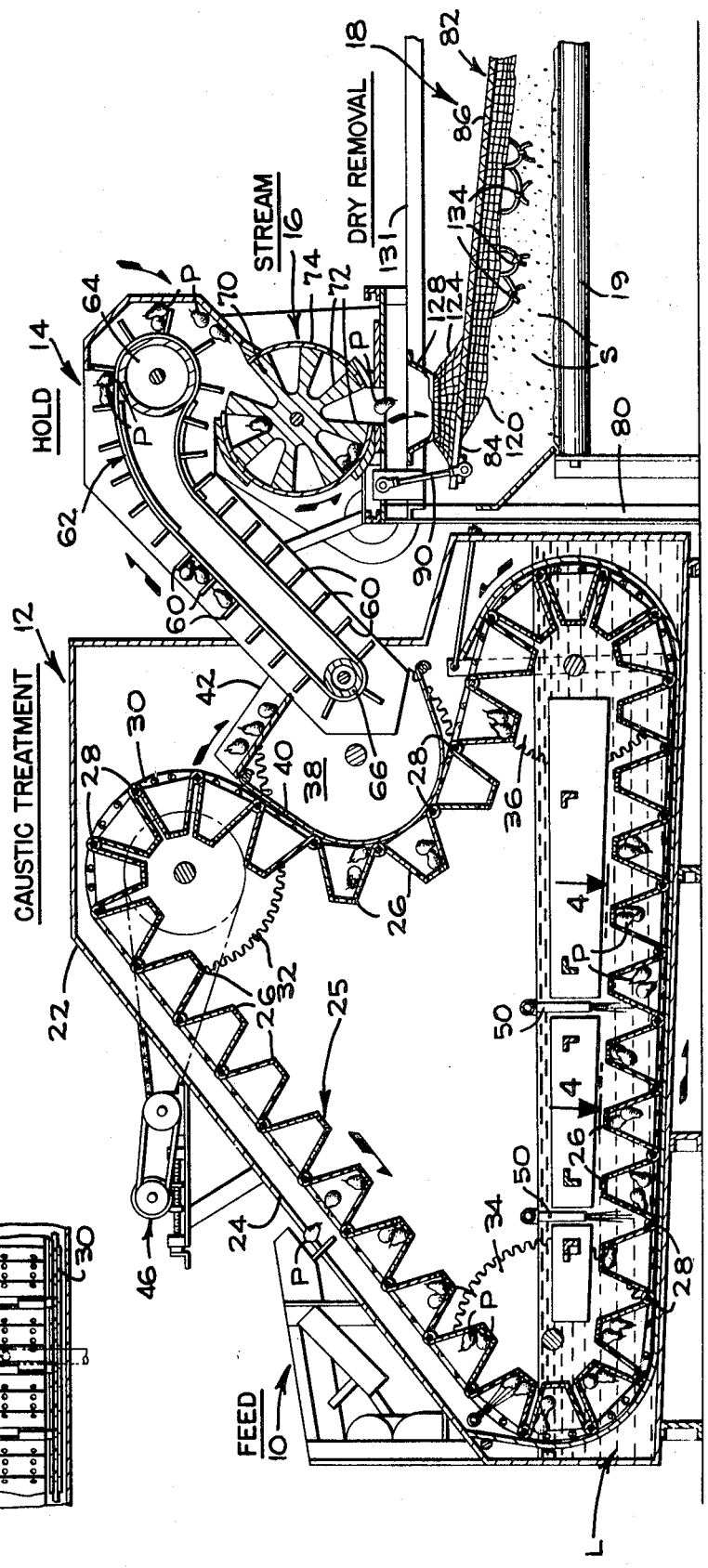
FIG_3
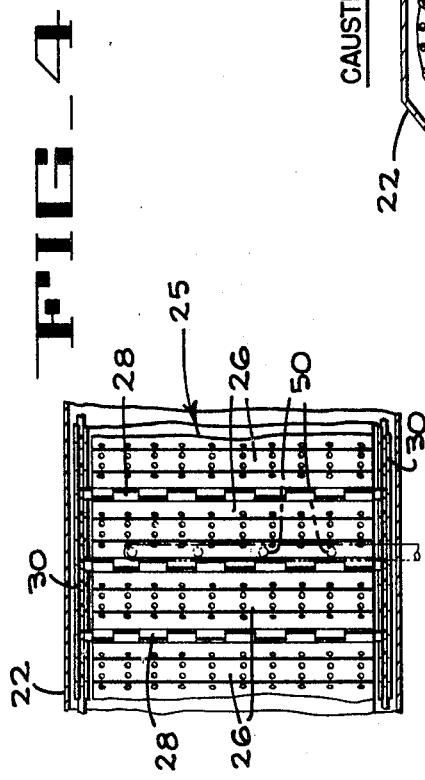
FIG_4

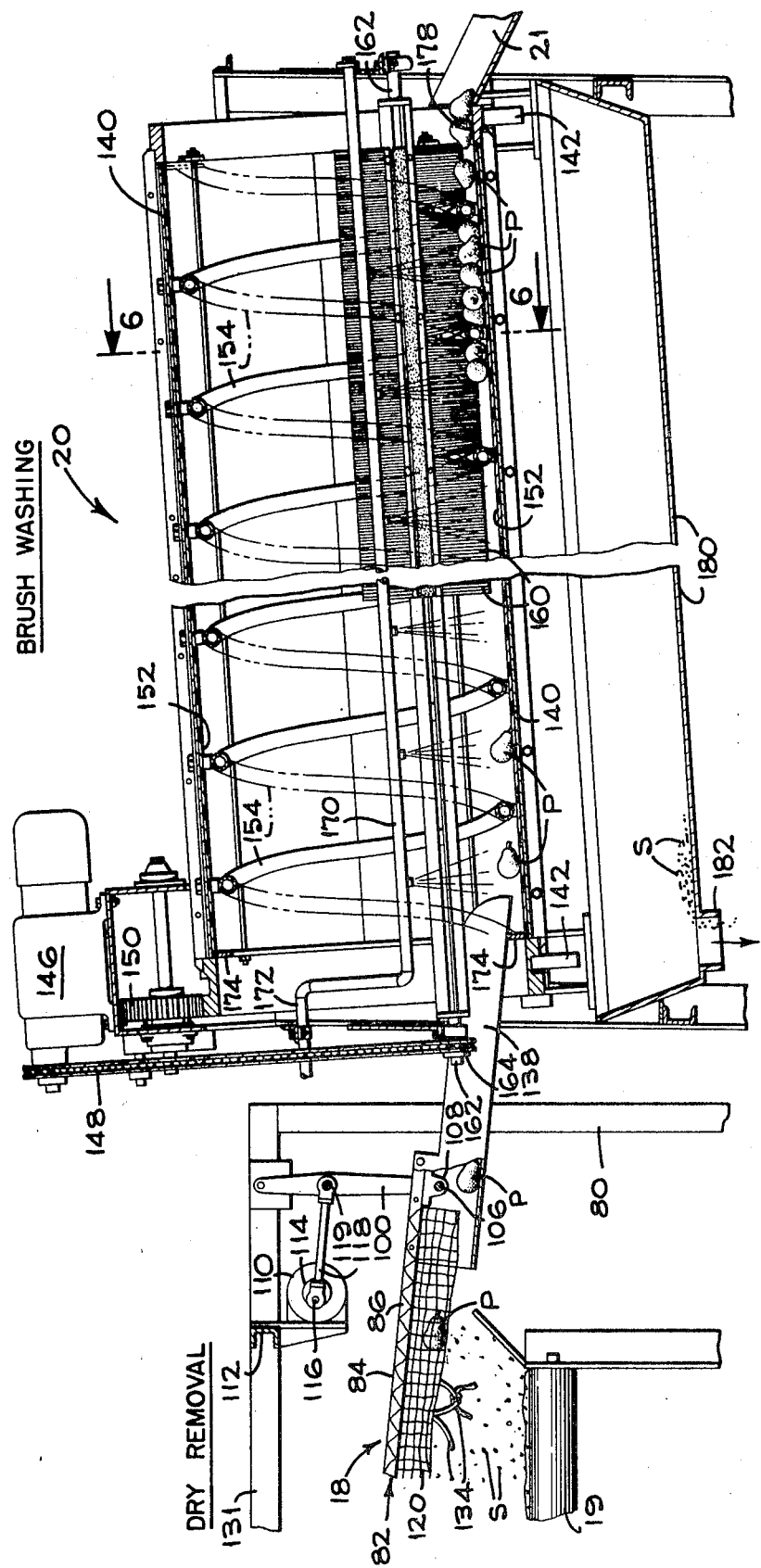

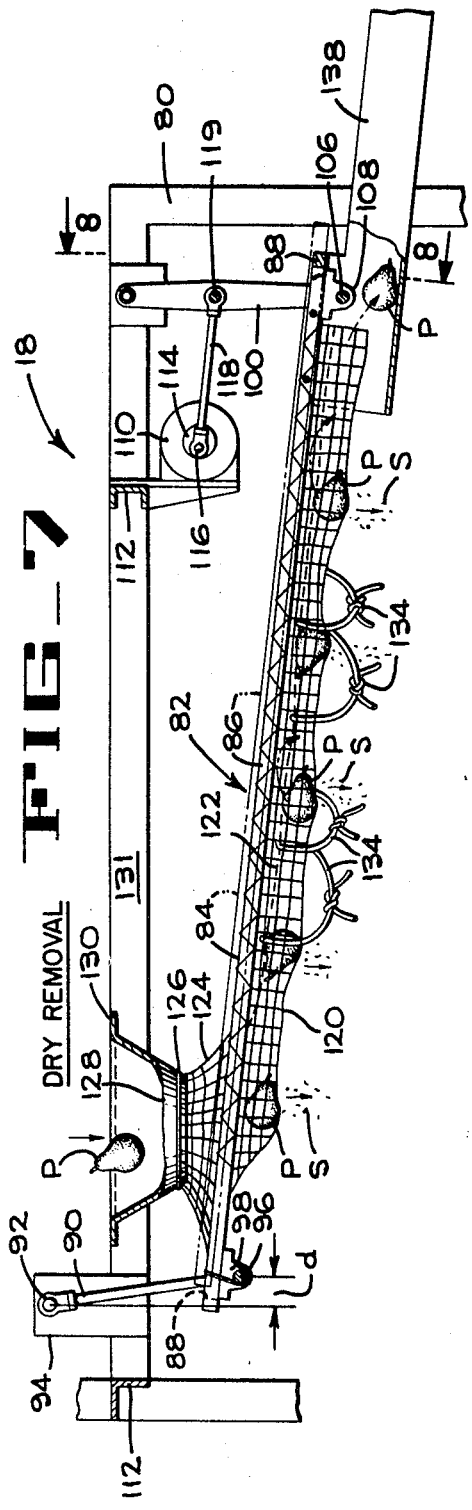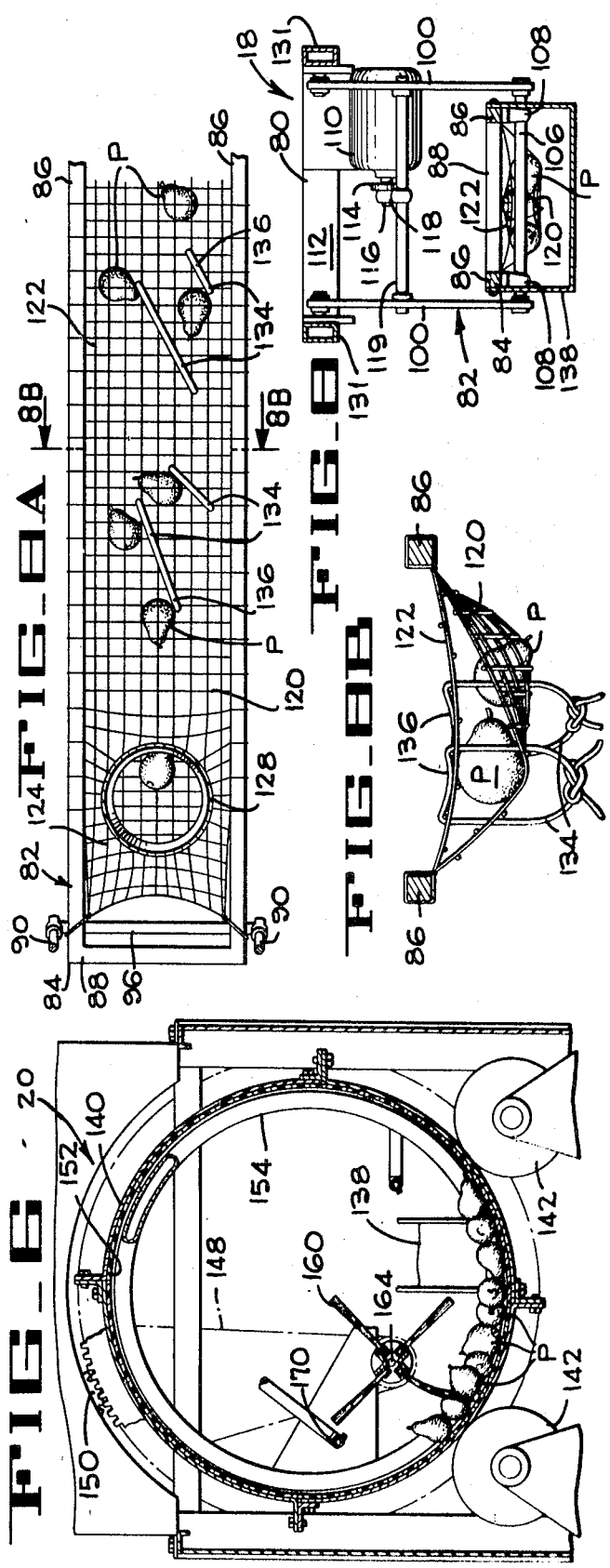

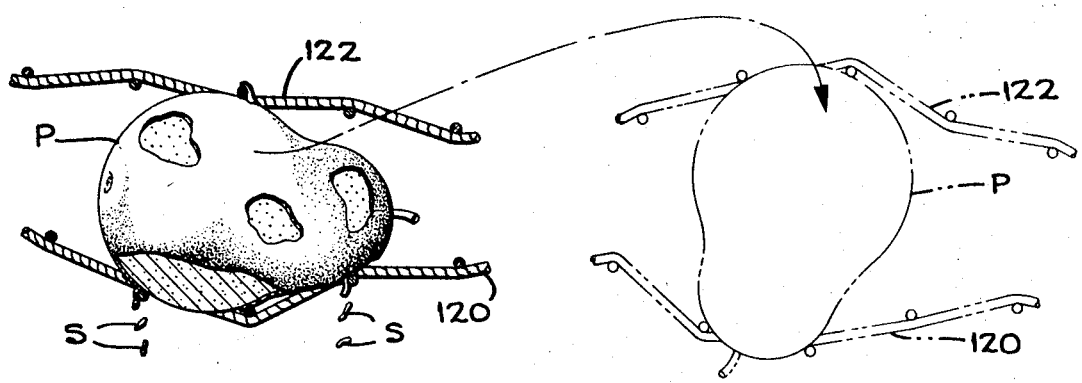
FIG_9
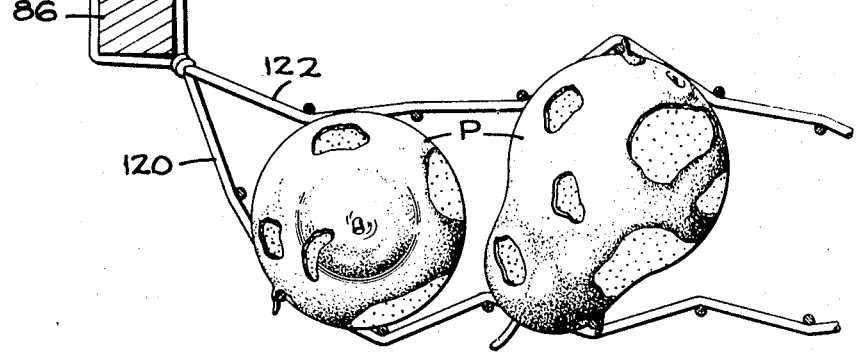
FIG_10
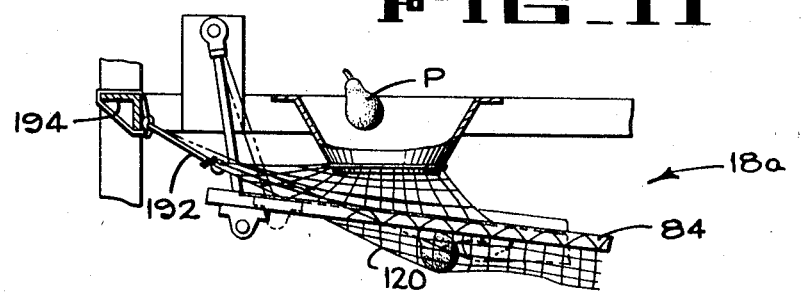
FIG_11
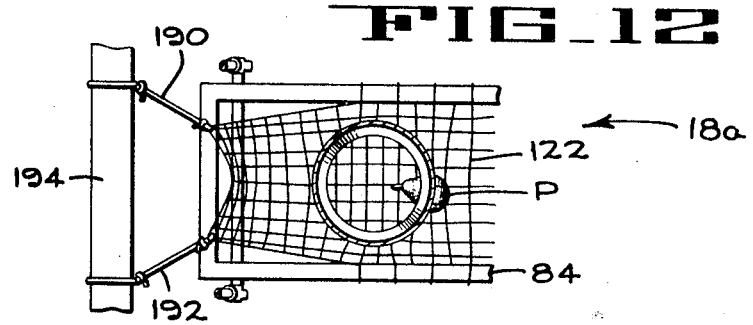
FIG_12

3,602,282

PEELING TREATED FRUIT TO MINIMIZE SEWAGE WASTE

FIELD OF THE INVENTION

This invention relates to the peeling of fruit and vegetables and more specifically to a peeling process wherein caustically loosened skins are removed by a preliminary peeling operation and without flushing, in between the caustic treatment bath and a final peeling and washing bath. Thus the skins and associated caustic from the preliminary peeling operation can be collected separately, dried and incinerated thereby minimizing the solids and chemicals sent to the sewage-disposal system.

DESCRIPTION OF THE PRIOR ART

Systems wherein fruit are chemically treated and peeled have been previously employed. For example, in the U.S. Pat. to Hickey et al., No. 3,246,677, Apr. 10, 1966, pears are immersed in a hot lye bath, passed through a holding stage and subjected to the action of steam in a steam valve. This process loosens the skins so that the pears thus treated can be transported by a water flume into a rotary brush washer which lightly abrades, dislodges and flushes the skins from the pears.

Systems of this type have a disadvantage that the caustic adhering to the fruit and dragged out from the initial treatment bath, as well as all the skins, must be flushed to the sewer thereby imposing a high cannery waste load on the sewage-disposal system.

A similar system which also provides cannery waste problems is shown in the U.S. Pat. to Kilburn et al., No. 2,781,070 Feb. 12, 1957.

It has been proposed to interpose a "dry removal" system between the caustic treatment units and a final abrading unit of a somewhat different type from the final abrading unit of the Hickey et al. patent, in order to minimize the amount of skins that must be removed in the final abrading and flushing unit. However, such proposals include the use of abrasive rollers or the like which provide a violent action on the fruit and damage delicate fruit such as pears, tomatoes or peaches. Such proposed systems also provide a substantial yield loss. The U.S. Pat. to Wilhelm, No. 3,480,057, Nov. 25, 1969 employs a rotating woven wire screen for the dry peeling of potatoes after caustic treatment followed by a high-pressure spray to remove the remaining skins.

Sijbring, U.S. Pat. No. 3,460,162, Aug. 5, 1969, introduces lye- or steam-treated potatoes inside of a cylindrical array of rotary brushes for dry peeling.

Vernon, U.S. Pat. No. 784,527, Mar. 7, 1905, drops halved and pitted fruit after lye treatment onto a row of brushes for peeling.

Scovill, U.S. Pat. No. 719,616, Feb. 3, 1903 peels air-heated tomatoes with pairs of toothed flexible belts.

Kirino, U.S. Pat. No. 1,312,332, Aug. 5, 1919, peels lye-treated tomatoes with a toothed rubber belt.

BRIEF SUMMARY OF THE INVENTION

The present invention includes a fruit-peeling system based on caustic treatment and light abrasion and washing of the fruit like the system of the aforesaid Hickey et al. patent, except that the system does not load the sewage disposal system with cannery waste and caustic to the extent of that patent. In accordance with the present invention, after the fruit has been immersed in a caustic bath, subjected to a holding step and steamed in a steam valve to loosen the skins, the fruit thus treated is deposited on a unit which has a moving, substantially planar abrading surface. The abrading surface supports and tumbles the caustically treated fruit and gently removes 50–80 percent of the skins (and associated caustic) without requiring water flushing during the process. These skins are also removed without scraping off any substantial portion of the flesh of the fruit, thereby minimizing the yield loss. Thus, the process can be employed with a delicate fruit such as pears, peaches and tomatoes.

The fruit thus prepeeled is introduced into a rotary brush washer such as that shown in the aforesaid Hickey et al. patent. In this washer, the few remaining skin fragments are lightly abraded from the fruit and are flushed into the sewer system. The prepeeling step of the present invention is so effective that the brush washer can be considerably shorter than that of the aforesaid Hickey et al. patent.

The skins and caustic removed in the prepeeling unit (between the caustic treatment and the brush washer) fall by gravity to a collecting conveyor or the like. This skin and caustic mass can be dried and incinerated, thus disposing of the material separately from the sewage-disposal system. Since a large portion of the skins are removed in the prepeeling unit and substantially all the caustic falls to the collecting conveyor along with the skins, the volume of cannery waste sent the associated sewage system is reduced.

In the preferred embodiment of the invention, the prepeeling unit which supports and tumbles the fruit is made up of a downwardly inclined framework which supports upper and lower coarse nettings. The fruit is admitted between the netting while the netting framework is oscillated. This causes the fruit to tumble between the nettings and to be abraded, while traversing down the nettings toward an entrance throat at the lower end thereof. The dislodged skins and associated caustic fall through the nettings onto a collector conveyor or the like beneath the nettings, for drying and subsequent incineration. A simple manner of transferring the prepeeled fruit emerging from the nettings to a brush washer or the like is provided by having the nettings themselves, or a chute attached at the end thereof, project into the open end of the washer, thereby eliminating the need for a water flume transport arrangement such as that shown in the aforesaid Hickey et al. patent.

BRIEF DESCRIPTION OF THE DRAWINGS

FIG. 1 is a plan view of a peeling system embodying the present invention.

FIG. 2 is a side elevation thereof.

FIG. 3 is an enlarged section through the caustic treatment unit.

FIG. 4 is a fragmentary plan of the caustic-treatment conveyor taken in the direction of arrows 4—4 of FIG. 3.

FIG. 5 is an enlarged sectional view of the brush washer.

FIG. 6 is a section of the brush washer taken on line 6—6 of FIG. 5.

FIG. 7 is a fragmentary enlarged side elevation of the dry removal unit.

FIG. 8 is a section of the unit taken on line 8—8 of FIG. 7.

FIG. 8A is a fragmentary plan of the dry removal unit.

FIG. 8B is a section taken on line 8B—8B of FIG. 8A.

FIG. 9 is a diagrammatic illustration under mode of operation of the dry removal unit.

FIG. 10 is an enlarged fragmentary transverse section through the unit.

FIG. 11 is a fragmentary side elevation of a modified dry peeler.

FIG. 12 is a plan of FIG. 11.

GENERAL DESCRIPTION OF THE PROCESS

In the embodiment of the present invention described, the peels are removed from whole, fresh pears by caustic treatment and abrasion in a manner which minimizes amount of skins and associated caustic that must be disposed of by the sewage system. Referring to FIGS. 1 and 2, the unpeeled pears are introduced into the system by means of a shuffle feeder 10 which advances the pears in rows into a caustic-treatment unit 12. The details of the shuffle feeder 10 are not critical to the invention and the feeder illustrated is disclosed in the U.S. Pat. to Chamberlin, No. 3,088,577, May 7, 1963. The pears discharged from the feeder 10 into the caustic-treatment unit 12 are immersed in a hot lye bath L (FIG. 3) at a selected temperature and pressure and for a predetermined immersion time as determined by the speed of an immersion conveyor 25 (FIGS. 3 and 4) for the pears.

After immersion in the caustic bath, the pears are removed from the bath by a hold unit 14 and since the pears thus removed are coated with caustic, the holding step coupled with the caustic treatment step weakens the skins of the pears and conditions them for subsequent removal.

After the holding step in the unit 14, the pears are discharged into a rotary steaming unit 16 of the type disclosed in the U.S. Pat. to de Back, No. 2,538,137, May 12, 1953. Reference is made to this patent for details of a suitable valve steaming unit, it being understood that these details are not critical to the present invention. In the steaming unit, the pears are successively subjected to the action of steam under pressure admitted by pipes not shown, but appearing in FIG. 4 in the aforesaid de Back unit. The action of the steam under pressure in the steam unit 16 activates the lye coating remaining on the pears from the holding step just completed and further loosens or even removes the skins of the more mature pears and at least loosens and partially disintegrates the skins on the harder pears.

The steamed pears are delivered by the steam unit 16 to a dry removal unit 18 embodying the present invention. In this unit the pears are supported and tumbled on a substantially planar netting and are confined by a similar netting above the supported netting. The action of the dry removal unit 18 is to lightly abrade the fruit and to dislodge loosened skins and associated treatment caustic as the pears traverse down along the unit. The skin and caustic fall to a take away conveyor 19 for drying and incineration.

The pears, which are 50–85 percent peeled or better, are conducted from the dry-removal unit 18 into a brush-washing unit 20 for a combined light abrasion and washing operation which removes remaining portions of the skins. The details of the brush-washing units are not critical to the invention and the unit illustrated herein is simply a shorter version of that shown in the aforesaid U.S. Pat. to Hickey et al., No. 3,192,974, July 2, 1962 also shown in Hickey et al., U.S. Pat. No. 3,246,677, Apr. 19, 1966. The brush-washing unit 20 also removes any cooked or browned layer of flesh underneath the caustically treated skins in the manner disclosed in the aforesaid Hickey et al. patent. The peeled, brushed and washed pears emerge from the brush-washing unit 20 by means of a chute or the like 21, for delivery to an orienting stemming, coring apparatus as shown in FIG. 2B of Hickey et al. The nature of the latter apparatus does not form part of the present invention and hence will not be further referred to.

The Caustic Treatment Unit

Although the peeling system of the present invention requires a caustic treatment of pears for loosening the skins before lightly abrading them, the system of the present invention is not dependent upon the construction details of any given type caustic treatment unit. However, and as mentioned previously, in order to disclose a complete peeling system, the caustic treatment unit of the aforesaid Hickey et al. patent has been incorporated in the embodiment of the invention being described. The salient features of this caustic treatment unit will be mentioned briefly, it being understood that details thereof as well as the typical time, temperature and lye concentration processing factors are all given by way of example in the aforesaid patent.

The caustic treatment unit 12 includes a generally enclosed chamber 22 which houses the pear-immersing conveyor 25 and the lye bath L for caustic treatment. The housing 22 is apertured at 24 for receiving the incoming pears P from the feed unit 10. The feed unit 10 discharges the pears into the immersion conveyor 25. This conveyor is made up of transverse apertured buckets 26 (see FIG. 4) which are hinged together at 28 and joined by the hinge pins to side chains 30. The side chains 30 pass over laterally spaced drive sprockets 32, one of which appears in FIG. 3, idler sprockets 34 at the immersion end of the lye bath L, idler sprockets 36 at the discharge end of the lye bath and bucket inverting idler sprockets 38 at which the pears P are discharged. The loaded buckets are inverted at the idlers 38, and a shield 40 is provided which retains the pears in the buckets until they reach a discharge chute 42, with which the pears tumble into the holding unit 14.

The lye bath L, in the embodiment illustrated, is a 10–20 percent by weight solution of lye and water heated to about 140° F. The bucket conveyor 25 is driven at a speed to provide an immersion time of 1–4 minutes. The immersion time is selected by operation of a variable-speed drive unit indicated generally at 46 (FIG. 3), details of which are not critical to the present invention.

As explained in the aforesaid Hickey et al. patent, not only are the pears immersed in a lye bath but they are sprayed with hot lye from transversely directed spray nozzles 50, FIGS. 3 and 4. The lye for these nozzles is delivered by a pump 52 (FIG. 2) through a heat exchanger 54 which receives hot steam by piping not shown. The heated lye flows into lateral, longitudinally spaced headers 56. These headers connect to the lateral spray nozzles 50 (FIG. 3), previously described. Systems for replenishing lye and water to maintain the desired concentration are utilized in the caustic treatment unit as explained in the aforesaid Hickey et al. patent, but since these details are not critical to the present invention, reference is made to that patent for a disclosure of a system which incorporates the aforesaid design and control features.

The Hold Unit

As mentioned, after the pears are lifted from the lye bath L at the sprockets 36 (FIG. 3) a holding period begins wherein the layer of hot caustic dragged up by the pears is given time to further penetrate and loosen the skins. During the holding period, the pears are carried up around the restraining panel 40 and discharged into the chute 42, this passage of the pears constituting part of the holding period. The pears are discharged from the chute 42 between flights 60 of an upwardly inclined conveyor 62.

The conveyor 62 has a drive pulley 64 (FIG. 3) and an idler pulley 66 and the drive pulley 64 is driven by a motor and gear reduction device 67 (FIG, 1) which may include a variable-speed transmission in order to assist in adjusting the holding time for the pears. In the system shown, the holding time may vary between 2–6 minutes which permits the lye that is dragged out with the pears to further penetrate and loosen the skins for subsequent removal.

The Steamer

The steaming unit 16 (FIGS. 2 and 3) is, as mentioned, like that disclosed in the U.S. Pat. to de Back, No. 2,638,237. It has a rotor 70 provided with a plurality of compartments 72 and rotating in a housing 74. The pears in the compartments 72 are subjected to the action of steam admitted to delivery pipes connected around the periphery of the housing, which pipes are not shown in FIGS. 2 and 3 for clarity but are explained in the aforesaid de Back patent. Thus, pears are dumped from the holding unit 14 into successive upper compartments 72 of the steamer unit. The rotor 70 of the steamer is rotated counterclockwise as viewed in FIG. 3 by means of a drive motor and transmission gearing the details of which are not critical to the present invention. It is only necessary that the speed of the rotor be selected or adjusted to match the flow rate of the pears through the system. The rotor 70 can be driven by the ring gear and pinion assembly as shown in FIG. 3 of the aforesaid de Back patent, the pinion shaft of which assembly can be driven by a variable speed transmission or motor, not shown.

The caustically treated and steamed pears P are delivered by compartments 72 of the steamer as they reach their lowermost positions into the dry removal unit 18, which unit comprises an essential feature of the present invention.

The Dry-Removal Unit

The dry-removal unit 18 is mounted between the steamer 16 and the brush washer 20 (FIGS. 1 and 2) and removes most of the skins and associated caustic from the previously treated and steamed pears. The dry-removal unit of the present invention supports and tumbles the caustically steamed fruit on a substantially planar abrading surface without flushing the fruit, to lightly abrade the fruit and remove peels and associated caustic. In the preferred embodiment of the invention, light abrasion of the fruit is accomplished by supporting it on a downwardly inclined coarse netting and by oscillating the netting in a direction of inclination for simultaneously abrading the fruit and causing the fruit to tumble and traverse down along the netting. Preferably, an upper coarse netting is provided which confines the fruit during the abrading and tumbling actions to significantly augment the peel removing action of both nettings.

In the embodiment shown, the dry-removal unit 18 is mounted on a frame 80 (FIGS. 1, 2 and 7) which supports an oscillating abrading and tumbling assembly indicated generally at 82. The assembly 82 includes a rectangular frame 84 having side bars 86 (See FIG. 8A) and crossbars 88 at each end thereof. The frame 84 is suspended from the main frame 80 for oscillation by means of links 90 at the fruit-receiving end of the frame. The upper ends of these links are pivoted at 92 (FIG. 7) to upstanding plates 94 projecting from the frame 80. The lower ends of the links 90 are pivoted on a cross-shaft 96 (FIGS. 7 and 8A) mounted in bearing blocks 98 (FIG. 7) on the underside of the side bars 86.

The support for the delivery end of the frame 84 is of the same general construction, although the delivery end is lower than the fruit-receiving end to provide a downwardly inclined abrading surface.

This end of the frame is supported by links 100 (FIGS. 7 and 8) pivoted on a cross-shaft 106 mounted in bearing blocks 108, secured to the lower frame side bars 86.

The netting frame 84 is oscillated by means of a motor and crank assembly. In the embodiment shown, an electric motor 110 (FIG. 7) is mounted on a crossbar 112 forming part of the main frame 80. The motor shaft drives a crank 114 having a crank pin 116 upon which one end of a connecting rod 118 is pivoted. The other end of the connecting rod 118 is pivoted to a drive bar 119 which spans the two suspending links 100 as best seen in FIG. 8.

As previously mentioned, the highly efficient, yet gentle abrading action which effects skin removal with a low-yield loss is provided by means of a netting construction supported on the rectangular frame 84. In the embodiment illustrated, the fruit is confined between upper and lower nettings as it is tumbled and abraded while traveling downwardly along the inclined abrading assembly 82. The lower netting is indicated at 120 and is formed of square woven nylon or similar coarse cords on about 1½-inch centers. This spacing of the cords in both lateral and longitudinal directions provides adequate skin discharge apertures and an effective nonclogging abrasive action without dropping pears through the netting. An upper netting 122 (FIG. 8B) is also provided for confining and additionally abrading the pears during tumbling. Both nettings are laced to the side bars 86 along their lengths. The cords of both nettings are not laid on the bias within the framework 84, but rather run longitudinally and laterally in that framework, thereby providing an effective support and confining action for the fruit supporting and peeling actions.

Means are provided for admitting fruit between the nettings 120, 122 while accommodating oscillation of the nettings along with the framework 84. As best seen in FIGS. 7 and 8A, this fruit-admission structure is simply a frustoconical netting 124. The lower face of this admission cone is secured or tied around an aperture formed in the upper netting 122. The upper face of the admission netting 124 is attached by a drawstring or the like above a retainer ring 126 that is secured at the lower end of an admission cone 128. The cone 128 depends from an apertured plate 130 (FIG. 7) which spans side rails 131 of the main frame 80. The entrance to the cone 128 is disposed directly beneath the pockets 72 of the steamer 16 (FIG. 3).

The abrading action of the nettings 120, 122 is augmented by interposing yielding abutments in the paths of the fruit as the fruit tumbles along the nettings. As seen in FIG. 7, 8A and 8B these abutments are in the form of ropes 134 looped through the lower netting 120. The upper reaches 136 of these ropes are diagonally disposed (FIG. 8A) to gently cam against the fruit while yieldingly abrading and tumbling the fruit as it passes along and over the ropes.

In order to deliver fruit, after it has been peeled and tumbled down along and in between the nettings 120, 122, the lower ends of the nettings are not attached together, but their margins are left open so that the fruit is discharged onto a chute 138. This chute depends from the slide bars 86 of the oscillating frame (FIG. 7) and leads into the brush washer 20. In the embodiment shown the fruit is delivered to the brush washer without requiring a flume and a stream or jet of water delivered by a nozzle as in the aforesaid Hickey et al. patent. This further reduces the water load on the sewage system.

It is a feature of the dry-removal unit 18 of the present invention that a hopping action is imparted to the fruit as it tumbles along between the nettings 120, 122 as well as causes the fruit to advance downwardly along the inclined surfaces of those nettings. This hopping action is provided by the geometry of the links 90, 100 previously described. The delivery links 100 are about 16 inches long and are vertically disposed on the backstroke of the oscillating crank 114. The links 90 at the receiving end of the abrading mechanism 82 are about 14 inches long and are so mounted that at the backstroke of the unit the lower pivot 96 is a distance d forward of the upper pivot 92 by about 4½ inches (see the left of FIG. 7). The overall length of the netting frame 84 is about 9 feet and it is about 16 inches wide. The framework 84 is inclined from the horizontal at an angle of about 5°. With this construction, the fruit-delivery end of the netting assembly 82 oscillates substantially in a horizontal plane. However, the fruit-receiving end, due to the geometry of the links 90 and their mounting moves from its lowermost position to an upper position, which is relatively higher than the corresponding upper position of the delivery end links 100.

The aforesaid lifting action by links 90 provides a progressive hopping or jumping of the fruit forward as indicated by the arrows in FIGS. 7 and 9, thereby successively presenting all faces of the fruit to the two nettings, as well as causing the fruit to tumble and traverse down the inclined netting towards the delivery throat thereof and onto the chute 140 as previously described. In the preferred embodiment of the invention the oscillating construction is constructed and operated to oscillate the netting at about 300 cycles per minute over a total stroke of about 3 inches which action has been found to effectively remove as high as 85 to 90 percent of the peels and associated dry caustic before the fruit enters the brush washer 20.

As previously mentioned, the skins S and associated caustic peeled from the fruit by the abrading structure just described, fall to a collector conveyor 19 beneath the dry removal unit for removal, drying and incineration, thereby relieving the sewage disposal system of the corresponding sewage waste load.

Brush Washer

As previously explained, the brush washer illustrated in the system embodying the present invention is like that of the patents to Hickey et al., such as U.S. Pat. No. 3,192,974, issued July 2, 1962, although due to the effectiveness of the dry-removal unit 18 of the present invention, the brush washer can be reduced in length. Also, since the brush washer need only remove recalcitant fragments of skin, the water rinse load from the brush washer is smaller than that from prior caustic peeling systems. The brush washer also removes and brushes away any heat-damaged layer of flesh that remains on the fruit as a result of the caustic treating and steaming operations, not removed in the dry-removal unit 18.

The brush washer includes a cylindrical drum 140 mounted on its ends by means of rollers 142 in a framework which causes the drum to rotate about an upwardly inclined axis towards the delivery chute 21. The drum is rotated by a drive motor 146 which drives a chain 148 that is connected to a driving pinion 150 and this pinion is meshed with gear teeth formed on the associated end of the drum. These details are not critical to the invention and a suitable driving construction including a variable-speed drive unit appears in FIG. 2 of the aforesaid Hickey et al., U.S. Pat. No. 3,192,974.

The drum 140 is lined with a layer of elastomeric material 152, such as plastic sponge or neoprene foam, bonded to the drum and a helical rib 154 is secured internally about the drum to provide a coupling action on the fruit as the drum rotates. A rotary brush 160 is mounted on an axle 162 at framework in each end of the drum and the brush is rotated by a sprocket 164 and the chain 148 previously described. It is understood that the details of the brush are not critical to the present invention and are shown in the aforesaid Hickey U.S. Pat. No. 3,192,974.

During the tumbling and light abrading action provided by the drum liner, the helical rib 154 and the brush 16, jets of water are sprayed on the fruit from a nozzle pipe 170 which is connected at 172 to a source of water pressure (not shown). It is noted that the fruit-receiving end of the drum is partially closed by a ring 174 which leaves an aperture for receiving the fruit-delivery chute 138 from the dry-removal unit 18. The other end of the drum is open as indicated at 178 so that the brushed and washed pears P emerge from the drum due to the progressive transfer action of the helical tumbling rib 154. A pan 180 is mounted beneath the drum for receiving water and skin fragments that are flushed from the drum which frag- ments may be delivered to a sewage-disposal system by a drain connection 182. Thus, the brush-washing step of the present invention further lightly abrades the fruit and removes remain- ing skin fragments at the indents, etc. and also assists in removing any remaining layer of cooked or browned flesh resulting from the caustic treatment and steaming steps im- parted to the fruit in the caustic and steaming units.

Operation

The operation of various units of the system of the present invention, including that of the dry-removal unit has been described in sufficient detail to provide an overall explanation of a pear-peeling system of the present invention. However, the operation will be reviewed briefly, tracing a fruit as it passes through the system.

Whole pears are fed by shuffle feeder 10 to the caustic unit treatment 12. (FIGS. 1 and 2).

The pears drop into transverse perforated buckets 26 on an immersion conveyor 25. The buckets are inverted as they pass through a lye bath L (FIG. 4) into the caustic treatment unit 12 and float up against the perforated walls of the buckets thereby subjecting them to efficient lye bath treatment. The lye is heated to accelerate the skin-loosening action and lye sprays from nozzles 50 to augment the tumbling action of the fruit in the buckets.

As the fruit emerges from the lye bath, it is carried by the buckets around the shield 40 and up onto the holding unit 14 during which process the lye dragged out with the fruit further penetrates and loosens the skins. The holding unit 14 deposits the caustically treated fruit into the pockets 72 of a steamer unit 16 which pockets are successively closed as a rotor rotates to subject the caustically treated fruit to the action of steam under pressure. This steam thoroughly loosens the skins for subsequent removal.

The pears are dropped from the steamer through a delivery cone 128 and a netting cone 124 (FIGS. 3 and 7) into the dry- removal unit 18 of the present invention. The pears falls between coarse lower and upper nettings 120, 122 which are mounted in a square framework 84 and which confine the fruit as well as supporting it on a substantially planar abrasive sur- face. The netting framework 84 is supported from oscillating links 90, 100 and the latter are oscillated by a rotating crank at around 300 cycles per minute. This action tumbles and ad- vances the fruit between the nettings and causes it to progress down along the nettings to a discharge throat to the delivery end thereof. During the progress of the fruit between the nettings, a large percentage of the skins and associated caustic is removed without flushing and this material falls by gravity through the lower netting onto the take away conveyor 19. The material on the conveyor 19 can be dried and incinerated and hence need not be introduced into the sewage-disposal system.

The peeled fruit emerging from the dry-removal unit 18 is conducted by chute 138 into the brush washing unit 20, which is like prior brush washing units but can be somewhat shorter doe to the efficient prepeeling action to which this fruit has been subjected. In the brush washer 20, the fruit is lightly brushed and sprayed with water to remove the remaining skin fragments as well as any remaining cooked outer layers of the fruit. Thus, whole, peeled fruit with fresh fruit surfaces ex- posed is delivered from the chute 21 to a pear-processing unit such as coring and trimming devices which do not form the subject matter of the present invention.

Thus, a dry-removal system is provided to minimize the load on a sewage-disposal system. In the preferred form of the in- vention, the dry-removal unit supports the fruit between generally oscillating surfaces in the form of coarse nettings that both support and confine the fruit. These nettings lightly abrade the fruit and have imparted thereto an oscillator dif- ferential lifting action that causes the fruit to tumble and ad- vance or progress down along the nettings to the delivery end of the dry-removal unit.

Modified Form

FIGS. 11 and 12 illustrate a modified dry-removal unit 18a wherein means are provided to augment the abrading action of the nettings 120, 122. The fruit-receiving ends of these nettings are attached to elastic, nonreinforced rubber hoses 190, 192, which hoses are made fast to the rear crossbar 194 of the main frame. The resultant elastic restraint of the nettings during oscillation of the netting frame 84 has been found to improve the peel-removing action of the unit.

Although the best mode contemplated for carrying out the present invention has been herein shown and described, it will be apparent that modification and variation may be made without departing from what is regarded to be the subject matter of the invention.

What is claimed is:

1. The method of continuously peeling fruit comprising the steps of caustically treating the whole fruit in order to loosen their skins, supporting and tumbling the caustically treated fruit on a normally substantially planar abradant netting without flushing the fruit to lightly abrade the fruit and to dislodge loosened skins and associated treatment caustic, col- lecting the dislodged skins and associated caustic separately from the fruit for dry disposition, and thereafter lightly abrad- ing the partially peeled fruit in the presence of flushing water for completing removal of the skins and associated caustic.

2. The method of claim 1, wherein the first light abrasion of the fruit is accomplished by supporting the fruit on downwardly inclined coarse netting, oscillating the netting in the direction of inclination for simultaneously abrading the fruit to dislodge skins and for causing the fruit to traverse and tumble along the netting, and causing the skins thus dislodged to fall through the netting for collection.

3. The method of claim 2, wherein the first light abrasion of the fruit is further accomplished by confining the upper faces of the fruit by an upper coarse netting.

4. The method of claim 3, wherein said upper coarse netting is oscillated with the lower coarse netting.

5. The method of peeling fruit or the like wherein the fruit has been treated to loosen the skins comprising the steps of confining the fruit between upper and lower coarse nettings with the lower netting supporting the fruit, oscillating the nettings to lightly abrade the fruit and dislodge the previously loosened skins, causing the dislodged skins to fall through the lower netting, collecting the peeled fruit from between the nettings, and collecting the dislodged skins separately from the fruit.

6. The method of claim 5, wherein the skins are dislodged solely by oscillating the nettings and without flushing the fruit during said dislodgement, so that the dislodged skins can be disposed of in bulk instead of being flushed down a water drain.

7. The method of claim 6, wherein the fruit to be peeled are pears, and the netting is oscillated at about 300 cycles per minute.

8. The method of claim 5, wherein the fruit-receiving ends of the nettings are elastically restrained against free oscillation with their support.

9. A fruit-peeling system for minimizing the introduction of solids and chemicals to the sewage system comprising means for treating the fruit in a hot caustic bath, a preliminary peeling unit comprising means for lightly abrading the treated fruit on a normally generally planar, oscillating coarse netting without flushing the fruit to dislodge loosened skins and associated caustic, conveyor means below said netting for collecting the dislodged skins and associated caustic separately from the fruit, a final-peeling unit comprising fruit abrading and washing means, and means for transferring the partially peeled fruit from said preliminary to said final-peeling unit.

10. A peeling unit for fruit that has been pretreated to loosen the skins, said unit comprising laterally spaced supports, upper and lower nettings on said supports for confining the fruit and with the lower netting supporting the fruit, means for introducing pretreated fruit between said nettings, means for oscillating said netting supports for causing the nettings to lightly abrade the fruit and dislodge the loosened skins, and conveyor means below said nettings for separate disposal of the dislodged skins.

11. The peeling unit of claim 10, wherein said netting-oscillating means causes skin dislodgement without the use of flushing water during the oscillations, so that the collected skins can be subjected to a substantially dry disposal system.

12. The unit of claim 10, wherein the netting interstices are about 1½ inches across.

13. The unit of claim 10, wherein said netting oscillating means operates at about 300 cycles per minute.

14. The unit of claim 10, wherein means are provided for elastically restraining the fruit-receiving ends of said nettings against free oscillation with their supports.

15. The unit of claim 10, wherein said netting supports are downwardly inclined along substantially their length so that oscillation of the supports and nettings causes the fruit to traverse along and tumble within the nettings, the lower ends of said nettings terminating in the free edges for egress of the peeled fruit.

16. The unit of claim 15, wherein said means for introducing pretreated fruit between the netting comprises a chute of netting material that extends through an upper end portion of said upper netting.

17. The unit of claim 15, wherein said netting supports are suspended by links at their ends, the links at the fruit-receiving ends being inclined from the vertical toward the links at the fruit-delivery ends, the links at the fruit-delivery ends being substantially vertical at their back stroke.

18. The unit of claim 17, wherein said links at the front receiving ends of the netting supports are somewhat shorter than those at the fruit delivery ends.

19. The unit of claim 10, wherein yielding abutments are supported by the lower netting in the paths of the fruit tumbling along the netting.

PO-1050
(5/69)

UNITED STATES PATENT OFFICE
CERTIFICATE OF CORRECTION

Patent No. 3,602,282                                Dated August 31, 1971

Inventor(s) KATSUJI HIRAHARA

It is certified that error appears in the above-identified patent
and that said Letters Patent are hereby corrected as shown below:

Column 4, line 55, change "No. 2,638,237" to --No. 2,638,137--.
Column 6, line 21, change "slide" to --side--.
Column 7, line 30, change "16" to --160--.

Signed and sealed this 6th day of June 1972.

(SEAL)
Attest:

EDWARD M. FLETCHER, JR.                ROBERT GOTTSCHALK
Attesting Officer                      Commissioner of Patents